(12) United States Patent
Strack et al.

(10) Patent No.: US 7,746,077 B2
(45) Date of Patent: Jun. 29, 2010

(54) METHOD FOR MEASURING THE MAGNETOTELLURIC RESPONSE TO THE EARTH'S SUBSURFACE

(75) Inventors: Kurt M. Strack, Houston, TX (US); Stefan L. Helwig, Houston, TX (US)

(73) Assignee: KJT Enterprises, Inc., Houston, TX (US)

( * ) Notice: Subject to any disclaimer, the term of this patent is extended or adjusted under 35 U.S.C. 154(b) by 406 days.

(21) Appl. No.: 11/742,352

(22) Filed: Apr. 30, 2007

(65) Prior Publication Data

US 2008/0265896 A1    Oct. 30, 2008

(51) Int. Cl.
*G01V 3/02*    (2006.01)

(52) U.S. Cl. ...................................... 324/365

(58) Field of Classification Search ........................ None
See application file for complete search history.

(56) References Cited

U.S. PATENT DOCUMENTS

| | | | |
|---|---|---|---|
| 2,325,199 | A | 7/1943 | Woods |
| 4,535,292 | A | 8/1985 | Ensing |
| 5,130,655 | A | 7/1992 | Conti |
| 5,467,018 | A | 11/1995 | Ruter et al. |
| H1524 | H * | 4/1996 | Thompson et al. .......... 324/334 |
| 5,563,513 | A | 10/1996 | Tasci et al. |
| 5,770,945 | A | 6/1998 | Constable |
| 5,870,690 | A | 2/1999 | Frenkel et al. |
| 5,877,995 | A | 3/1999 | Thompson et al. |
| 5,955,884 | A | 9/1999 | Payton et al. |
| 6,188,221 | B1 | 2/2001 | Van de Kop et al. |
| 6,225,806 | B1 | 5/2001 | Millar et al. |
| 6,320,386 | B1 | 11/2001 | Balashov et al. |
| 6,339,333 | B1 | 1/2002 | Kuo |
| 6,541,975 | B2 | 4/2003 | Strack |
| 6,603,313 | B1 | 8/2003 | Srnka |
| 6,628,119 | B1 | 9/2003 | Eidesmo et al. |
| 6,664,788 | B2 | 12/2003 | Hornbostel et al. |
| 6,696,839 | B2 | 2/2004 | Ellingsrud et al. |
| 6,717,411 | B2 | 4/2004 | Ellingsrud et al. |
| 6,739,165 | B1 | 5/2004 | Strack |
| 6,842,006 | B2 | 1/2005 | Conti et al. |

(Continued)

FOREIGN PATENT DOCUMENTS

CA    2531801 A1    1/2005

(Continued)

OTHER PUBLICATIONS

Sinha, M.C. Patel, P.D., Unsworth, M.J., Owen, T.R.E., and Mac-Cormack, M.G.R., 1990, An active source electromagnetic sounding system for marine use, Marine Geophysical Research, 12, 29-68.

(Continued)

*Primary Examiner*—Jay M Patidar
(74) *Attorney, Agent, or Firm*—Richard A. Fagin

(57) ABSTRACT

A method for measuring magnetotelluric response of the Earth includes measuring transient controlled source electromagnetic response of the subsurface below a body of water over a plurality of actuations of an electromagnetic transmitter. The transient response measurements are stacked. The stacked transient responses are subtracted from measurements of total electromagnetic Earth response over a time period including the plurality of transient response measurements to generate the magnetotelluric response.

5 Claims, 5 Drawing Sheets

U.S. PATENT DOCUMENTS

| | | | |
|---|---|---|---|
| 6,859,038 | B2 | 2/2005 | Ellingsrud et al. |
| 6,864,684 | B2 | 3/2005 | Ellingsrud et al. |
| 6,914,433 | B2 | 7/2005 | Wright et al. |
| 6,950,747 | B2 | 9/2005 | Byerly |
| 7,023,213 | B2 | 4/2006 | Nichols |
| 7,038,456 | B2 | 5/2006 | Ellingsrud et al. |
| 7,042,801 | B1 | 5/2006 | Berg |
| 7,061,829 | B2 | 6/2006 | Scott |
| 7,113,448 | B2 | 9/2006 | Scott |
| 7,113,868 | B2 | 9/2006 | Brewster |
| 7,126,338 | B2 | 10/2006 | MacGregor et al. |
| 7,141,968 | B2 | 11/2006 | Hibbs et al. |
| 7,141,987 | B2 | 11/2006 | Hibbs et al. |
| 7,145,341 | B2 | 12/2006 | Ellingsrud et al. |
| 7,191,063 | B2 | 3/2007 | Tompkins |
| 7,202,669 | B2 | 4/2007 | Ellingsrud et al. |
| 7,203,599 | B1 | 4/2007 | Strack et al. |
| 7,565,245 | B2 * | 7/2009 | Andreis et al. .................. 702/7 |
| 2004/0232917 | A1 | 11/2004 | Wright et al. |
| 2006/0038570 | A1 * | 2/2006 | Constable ................... 324/334 |
| 2006/0091889 | A1 | 5/2006 | Ellingsrud et al. |
| 2006/0129322 | A1 | 6/2006 | MacGregor et al. |
| 2006/0132137 | A1 | 6/2006 | MacGregor et al. |
| 2006/0197532 | A1 | 9/2006 | Eidesmo et al. |
| 2007/0021916 | A1 | 1/2007 | MacGregor et al. |
| 2007/0075708 | A1 | 4/2007 | Reddig et al. |

FOREIGN PATENT DOCUMENTS

| | | |
|---|---|---|
| WO | WO 0157555 A1 | 8/2001 |
| WO | WO 03048812 A1 | 6/2003 |

OTHER PUBLICATIONS

Edwards, R.N., Law, L.K., Wolfgram, P.A., Nobes, D.C., Bone, M.N., Trigg, D.F., and DeLaurier, J.M., 1985, First results of the Moses experiment: Sea sediment conductivity and thickness determination, Bute Inlet, British Columbia, by magnetometric offshore electrical sounding: Geophysics 50, No. 1, 153-160.

Edwards, R.N., 1997, On the resource evaluation of marine gas hydrate deposits using the sea-floor transient electric dipole-dipole method: Geophysics, 62, No. 1, 63-74.

Chave, A.D., Constable, S.C. and Edwards, R.N., 1991, Electrical exploration methods for the seafloor: Investigation in geophysics No. 3, Electromagnetic methods in applied geophysics, vol. 2, application, part B, 931-966.

Cheesman, S.J., Edwards, R.N., and Chave, A.D., 1987, On the theory of sea-floor conductivity mapping using transient electromagnetic systems: Geophysics, 52, No. 2, 204 217.

Edwards, N., 2005, Marine controlled source electromagnetics: Principles, Methodologies, Future commercial applications: Surveys in Geophysics, No. 26, 675-700.

Constable, S., 2006, Marine electromagnetic methods—A new tool for offshore exploration: The Leading Edge v. 25, No. 4, p. 438-444.

Christensen, N. B. and Dodds, K., 2007, 1D inversion and resolution analysis of marine CSEM data, Geophysics 72, WA27.

Chen, J., Hoversten, G. M., Vasco, D., Rubin, Y., and Hou, Z., 2007, A Bayesian model for gas saturation estimation using marine seismic AVA and CSEM data, Geophysics 72, WA85.

Constable, S. and Srnka, L. J., 2007, An introduction to marine controlled-source electromagnetic methods for hydrocarbon exploration, Geophysics 72, WA3.

Evans, R. L, 2007, Using CSEM techniques to map the shallow section of seafloor: From the coastline to the edges of the continental slope, Geophysics 72, WA105.

Darnet, M., Choo, M. C. K., Plessix, R. D., Rosenquist, M. L., Yip-Cheong, K., Sims, E., and Voon, J. W. K., 2007, Detecting hydrocarbon reservoirs from CSEM data in complex settings: Application to deepwater Sabah, Malaysia, Geophysics 72, WA97.

Gribenko, A. and Zhdanov, M., 2007, Rigorous 3D inversion of marine CSEM data based on the integral equation method, Geophysics 72, WA73.

Li, Y. and Key, K. 2007, 2D marine controlled-source electromagnetic modeling: Part 1—An adaptive finite-element algorithm, Geophysics 72, WA51.

Li, Y. and Constable, S., 2007, 2D marine controlled-source electromagnetic modeling: Part 2—The effect of bathymetry, Geophysics 72, WA63.

Scholl, C. and Edwards, R. N., 2007, Marine downhole to seafloor dipole-dipole electromagnetic methods and the resolution of resistive targets, Geophysics 72, WA39.

Tompkins, M. J. and Srnka, L. J., 2007, Marine controlled-source electromagnetic methods—Introduction, Geophysics 72, WA1.

Um, E. S. and Alumbaugh, D. L., 2007, On the physics of the marine controlled-source electromagnetic method, Geophysics 72, WA13.

Dell'Aversana, P., 2007, Improving interpretation of CSEM in shallow water, The Leading Edge 26, 332; Hokstad, K., and Rosten, T., 2007, On the relationships between depth migration of controlled-source electromagnetic and seismic data, The Leading Edge 26, 342.

Johansen, S. E., Wicklund, T. A. and Amundssen, H. E. F., 2007, Interpretation example of marine CSEM data, The Leading Edge 26, 348.

MacGregor, L., Barker, N., Overton, A., Moody, S., and Bodecott, D., 2007, Derisking exploration prospects using integrated seismic and electromagnetic data—a Falkland Islands case study, The Leading Edge 26, 356.

Strack, K.-M., 1992, Exploration with deep transient electromagnetics, Elsevier, 373 pp. (reprinted 1999).

Sternberg, B. K., Washburne, J. C. and Pellerin, L., 1988, Correction for the static shift in magnetotellurics using transient electromagnetic soundings, Geophysics, vol. 53, Issue 11, pp. 1459-1468.

Torres-Verdin, C, 1991, Continuous profiling of magnetotelluric fields, Ph.D. Thesis, University of California.

Torres-Verdin, C. and Bostick Jr, F.X., 1992, Principles of spatial surface electric field filtering in magnetotellurics: Electromagnetic array profiling (EMAP), Geophysics, vol. 57, Issue 4, pp. 603-622.

* cited by examiner

METHOD FOR MEASURING THE MAGNETOTELLURIC RESPONSE TO THE EARTH'S SUBSURFACE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine electromagnetic geophysical surveying. More specifically, the invention relates to cables and related apparatus for acquiring, recording and transmitting electromagnetic signals produced for subsurface Earth surveying.

2. Background Art

Electromagnetic geophysical surveying includes "controlled source" and natural source electromagnetic surveying. Controlled source electromagnetic surveying includes imparting an electric field or a magnetic field into the Earth formations, those formations being below the sea floor in marine surveys, and measuring electric field amplitude and/or amplitude of magnetic fields by measuring voltage differences induced in electrodes, antennas and/or interrogating magnetometers disposed at the Earth's surface, or on or above the sea floor. The electric and/or magnetic fields are induced in response to the electric field and/or magnetic field imparted into the Earth's subsurface, and inferences about the spatial distribution of conductivity of the Earth's subsurface are made from recordings of the induced electric and/or magnetic fields.

Natural source electromagnetics includes multi-components ocean bottom receiver stations and by taking the ratio of perpendicular field components, one can eliminate the need to know the natural source. Hereto, natural source electromagnetics for marine applications has been restricted to autonomous recording stations.

Controlled source electromagnetic surveying known in the art includes imparting alternating electric current into formations below the sea floor. The alternating current has one or more selected frequencies. Such surveying is known as frequency domain controlled source electromagnetic (f-CSEM) surveying. f-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68. Other publications which describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153-160; Edwards, R. N., 1997, *On the resource evaluation of marine gas hydrate deposits using the sea-floor transient electric dipole-dipole method*: Geophysics, 62, No. 1, 63-74; Chave, A. D., Constable, S. C. and Edwards, R. N., 1991, *Electrical exploration methods for the seafloor*: Investigation in geophysics No 3, Electromagnetic methods in applied geophysics, vol. 2, application, part B, 931-966; and Cheesman, S. J., Edwards, R. N., and Chave, A. D., 1987, *On the theory of sea-floor conductivity mapping using transient electromagnetic systems*: Geophysics, 52, No. 2, 204-217.

Other publications of interest in the technical field of electromagnetic surveying include Edwards, N., 2005, Marine controlled source electromagnetics: Principles, Methodologies, Future commercial applications: Surveys in Geophysics, No. 26, 675-700; Constable, S., 2006, Marine electromagnetic methods—A new tool for offshore exploration: The Leading Edge v. 25, No. 4, p. 438-444; Christensen, N. B. and Dodds, K., 2007, 1D inversion and resolution analysis of marine CSEM data, Geophysics 72, WA27; Chen, J., Hoversten, G. M., Vasco, D., Rubin, Y., and Hou, Z., 2007, A Bayesian model for gas saturation estimation using marine seismic AVA and CSEM data, Geophysics 72, WA85; Constable, S. and Srnka, L. J., 2007, An introduction to marine controlled-source electromagnetic methods for hydrocarbon exploration, Geophysics 72, WA3; Evans, R. L., 2007, Using CSEM techniques to map the shallow section of seafloor: From the coastline to the edges of the continental slope, Geophysics 72, WA105; Damet, M., Choo, M. C. K., Plessix, R. D., Rosenquist, M. L., Yip-Cheong, K., Sims, E., and Voon, J. W. K., 2007, Detecting hydrocarbon reservoirs from CSEM data in complex settings: Application to deepwater Sabah, Malaysia, Geophysics 72, WA97; Gribenko, A. and Zhdanov, M., 2007, Rigorous 3D inversion of marine CSEM data based on the integral equation method, Geophysics 72, WA73; Li, Y. and Key, K. 2007, 2D marine controlled-source electromagnetic modeling: Part 1—An adaptive finite-element algorithm, Geophysics 72, WA51; Li, Y. and Constable, S., 2007, 2D marine controlled-source electromagnetic modeling: Part 2—The effect of bathymetry, Geophysics 72, WA63; Scholl, C. and Edwards, R. N., 2007, Marine downhole to seafloor dipole-dipole electromagnetic methods and the resolution of resistive targets, Geophysics 72, WA39; Tompkins, M. J. and Srnka, L. J., 2007, Marine controlled-source electromagnetic methods—Introduction, Geophysics 72, WA1; Um, E. S. and Alumbaugh, D. L., 2007, On the physics of the marine controlled-source electromagnetic method, Geophysics 72, WA13; Dell'Aversana, P., 2007, Improving interpretation of CSEM in shallow water, The Leading Edge 26, 332; Hokstad, K., and Rosten, T., 2007, On the relationships between depth migration of controlled-source electromagnetic and seismic data, The Leading Edge 26, 342; Johansen, S. E., Wicklund, T. A. and Amundssen, H. E. F., 2007, Interpretation example of marine CSEM data, The Leading Edge 26, 348; and MacGregor, L., Barker, N., Overton, A., Moody, S., and Bodecott, D., 2007, Derisking exploration prospects using integrated seismic and electromagnetic data—a Falkland Islands case study, The Leading Edge 26, 356.

Following are described several patent publications which describe various aspects of electromagnetic subsurface Earth surveying. U.S. Pat. No. 5,770,945 issued to Constable describes a magnetotelluric (MT) system for sea floor petroleum exploration. The disclosed system includes a first waterproof pressure case containing a processor, AC-coupled magnetic field post-amplifiers and electric field amplifiers, a second waterproof pressure case containing an acoustic navigation/release system, four silver-silver chloride electrodes mounted on booms and at least two magnetic induction coil sensors. These elements are mounted together on a plastic and aluminum frame along with flotation devices and an anchor for deployment to the sea floor. The acoustic navigation/release system serves to locate the measurement system by responding to acoustic "pings" generated by a ship-board unit, and receives a release command which initiates detachment from the anchor so that the buoyant package floats to the surface for recovery. The electrodes used to detect the electric field are configured as grounded dipole antennas. Booms by which the electrodes are mounted onto a frame are positioned in an X-shaped configuration to create two orthogonal dipoles. The two orthogonal dipoles are used to measure the complete vector electric field. The magnetic field sensors are multi-turn, Mu-metal core wire coils which detect magnetic fields within the frequency range typically used for land-based MT surveys. The magnetic field coils are encased in waterproof pressure cases and are connected to the logger package by high pressure waterproof cables. The logger unit includes amplifiers for amplifying the signals received from the various sensors, which signals are then provided to the processor which controls timing, logging, storing and power switching operations. Temporary and mass storage is provided within and/or peripherally to the processor. There is no active source in such MT methods, which rely upon naturally occurring EM fields.

U.S. Pat. No. 6,603,313 B1 issued to Srnka discloses a method for surface estimation of reservoir properties, in which average earth resistivities above, below, and horizontally adjacent to specifically located subsurface geologic formations are first determined or estimated using geological and geophysical data in the vicinity of the subsurface geologic formation. Then dimensions and probing frequency for an electromagnetic source are determined to substantially maximize transmitted vertical and horizontal electric currents at the subsurface geologic formation, using the location and the average earth resistivities. Next, the electromagnetic source is activated at or near the sea floor, approximately centered above the subsurface geologic formation and a plurality of components of electromagnetic response is measured with a receiver array. Geometrical and electrical parameter constraints are determined, using the geological and geophysical data. Finally, the electromagnetic response is processed using the geometrical and electrical parameter constraints to produce inverted vertical and horizontal resistivity depth images. Optionally, the inverted resistivity depth images may be combined with the geological and geophysical data to estimate the reservoir fluid and shaliness (fractional volume in the formation of clay-bearing rocks called "shale") properties.

U.S. Pat. No. 6,628,110 B1 issued to Eidesmo et al. discloses a method for determining the nature of a subterranean reservoir whose approximate geometry and location are known. The disclosed method includes: applying a time varying electromagnetic field to the strata containing the reservoir; detecting the electromagnetic wave field response; and analyzing the effects on the characteristics of the detected field that have been caused by the reservoir, thereby determining the content of the reservoir, based on the analysis.

U.S. Pat. No. 6,541,975 B2 issued to Strack discloses a system for generating an image of an Earth formation surrounding a borehole penetrating the formation. Resistivity of the formation is measured using a DC measurement, and conductivity and resistivity of the formations are measured with a time domain signal or AC measurement. Acoustic velocity of the formation is also measured. The DC resistivity measurement, the conductivity measurement made with a time domain electromagnetic signal, the resistivity measurement made with a time domain electromagnetic signal and the acoustic velocity measurements are combined to generate the image of the Earth formation.

International Patent Application Publication No. WO 0157555 A1 discloses a system for detecting a subterranean reservoir or determining the nature of a subterranean reservoir whose position and geometry is known from previous seismic surveys. An electromagnetic field is applied by a transmitter on the seabed and is detected by antennae also on the seabed. A refracted wave component is sought in the wave field response, to determine the nature of any reservoir present.

International Patent Application Publication No. WO 03048812 A1 discloses an electromagnetic survey method for surveying an area previously identified as potentially containing a subsea hydrocarbon reservoir. The method includes obtaining first and second survey data sets with an electromagnetic source aligned end-on and broadside relative to the same or different receivers. The invention also relates to planning a survey using this method, and to analysis of survey data taken in combination so as to allow the galvanic contribution to the signals collected at the receiver to be contrasted with the inductive effects, and the effects of signal attenuation (which are highly dependent on local properties of the rock formation, overlying water, and air at the survey area). This is very important to the success of using electromagnetic surveying for identifying hydrocarbon reserves and distinguishing them from other classes of subsurface formations.

U.S. Pat. No. 6,842,006 B1 issued to Conti et al. discloses a sea-floor electromagnetic measurement device for obtaining underwater magnetotelluric (MT) measurements of earth formations. The device includes a central structure with arms pivotally attached thereto. The pivoting arms enable easy deployment and storage of the device. Electrodes and magnetometers are attached to each arm for measuring electric and magnetic fields respectively, the magnetometers being distant from the central structure such that magnetic fields present therein are not sensed. A method for undertaking sea floor measurements includes measuring electric fields at a distance from the structure and measuring magnetic fields at the same location.

U.S. patent application Publication No. 2004/232917 and U.S. Pat. No. 6,914,433 Detection of subsurface resistivity contrasts with application to location of fluids (Wright, et al) relate to a method of mapping subsurface resistivity contrasts by making multichannel transient electromagnetic (MTEM) measurements on or near the Earth's surface using at least one source, receiving means for measuring the system response and at least one receiver for measuring the resultant earth response. All signals from each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored.

U.S. Pat. No. 5,467,018 issued to Rueter et al. discloses a bedrock exploration system. The system includes transients generated as sudden changes in a transmission stream, which are transmitted into the Earth's subsurface by a transmitter. The induced electric currents thus produced are measured by several receiver units. The measured values from the receiver units are passed to a central unit. The measured values obtained from the receiver units are digitized and stored at the measurement points, and the central unit is linked with the measurement points by a telemetry link. By means of the telemetry link, data from the data stores in the receiver units can be successively passed on to the central unit.

U.S. Pat. No. 5,563,913 issued to Tasci et al. discloses a method and apparatus used in providing resistivity measurement data of a sedimentary subsurface. The data are used for developing and mapping an enhanced anomalous resistivity pattern. The enhanced subsurface resistivity pattern is associated with and an aid for finding oil and/or gas traps at various depths down to a basement of the sedimentary subsurface. The apparatus is disposed on a ground surface and includes an electric generator connected to a transmitter with a length of wire with grounded electrodes. When large amplitude, long period, square waves of current are sent from a transmission site through the transmitter and wire, secondary eddy currents are induced in the subsurface. The eddy currents induce magnetic field changes in the subsurface which can be measured at the surface of the earth with a magnetometer or induction coil. The magnetic field changes are received and recorded as time varying voltages at each sounding site. Information on resistivity variations of the subsurface formations is deduced from the amplitude and shape of the measured magnetic field signals plotted as a function of time after applying appropriate mathematical equations. The sounding sites are arranged in a plot-like manner to ensure that areal contour maps and cross sections of the resistivity variations of the subsurface formations can be prepared.

Other U.S. Patent documents that provide background information concerning the present invention include the following:

U.S. Pat. No. 4,535,292 Transmitter for an electromagnetic survey system with improved power supply switching system (Ensing).

U.S. Pat. No. 5,130,655 Multiple-coil magnetic field sensor with series-connected main coils and parallel-connected feedback coils (Conti).

U.S. Pat. No. 5,877,995 Geophysical prospecting (Thompson et al.).

U.S. Pat. No. 5,955,884 Method and apparatus for measuring transient electromagnetic and electrical energy components propagated in an earth formation (Payton et al.).

U.S. Pat. No. 6,188,221 Method and apparatus for transmitting electromagnetic waves and analyzing returns to locate underground fluid deposits (Van de Kop et al.).

U.S. Pat. No. 6,225,806 Electroseismic technique for measuring the properties of rocks surrounding a borehole (Millar et al.).

U.S. Pat. No. 6,339,333 Dynamic electromagnetic methods for direct prospecting for oil (Kuo).

U.S. Pat. No. 6,628,119 Method and apparatus for determining the content of subterranean reservoirs (Eidesmo, et al).

U.S. Pat. No. 6,664,788 Nonlinear electroseismic exploration (Scott C. Hornbostel, et al).

U.S. Pat. No. 6,696,839 Electromagnetic methods and apparatus for determining the content of subterranean reservoirs (Svein Ellingsrud et al).

U.S. Pat. No. 6,717,411 Electromagnetic method and apparatus for determining the nature of subterranean reservoirs using refracted electromagnetic waves (Ellingsrud, et al).

U.S. Pat. No. 6,859,038 Method and apparatus for determining the nature of subterranean reservoirs using refracted electromagnetic waves (Svein Ellingsrud, et al).

U.S. Pat. No. 6,864,684 Electromagnetic methods and apparatus for determining the content of subterranean reservoirs (Ellingsrud, et al).

U.S. Pat. No. 6,864,684 Electromagnetic methods and apparatus for determining the content of subterranean reservoirs (Ellingsrud, et al).

U.S. Pat. No. 7,023,213 Subsurface conductivity imaging systems and methods (Edward Nichols).

U.S. Pat. No. 7,038,456 Method and apparatus for determining the nature of subterranean reservoirs (Ellingsrud, et al).

U.S. Pat. No. 7,042,801 System for geophysical prospecting using induce electrokinetic effect (Andrey Berg).

U.S. Pat. No. 7,126,338 Electromagnetic surveying for hydrocarbon reservoirs (MacGregor, Lucy et al.).

U.S. Pat. No. 7,141,968 Integrated sensor system for measuring electric and/or magnetic field vector components (Hibbs, et al).

U.S. Pat. No. 7,141,987 Sensor system for measurement of one or more vector components of an electric field (Hibbs, et al).

U.S. Pat. No. 7,145,341 Method and apparatus for recovering hydrocarbons from subterranean reservoirs (Ellingsrud, et al).

U.S. Pat. No. 7,191,063 Electromagnetic surveying for hydrocarbon reservoirs (Tompkins).

U.S. Pat. Appl. Pub. No. 2006/0091889 Method and apparatus for determining the nature of subterranean reservoirs (Ellingsrud, Svein et al) application Ser. No. 11/301,010 filed on Dec. 12, 2005., granted as U.S. Pat. No. 7,202,669 on Apr. 10, 2007.

U.S. Pat. Appl. Pub. No. 2006/0129322 Electromagnetic surveying for hydrocarbon reservoirs (MacGregor, Lucy et al)

U.S. Pat. Appl. Pub. No. 2006/0132137 Electromagnetic surveying for hydrocarbon reservoirs (MacGregor, Lucy et al).

U.S. Pat. Appl. Pub. No. 2006/0197532 Method and apparatus for determining the nature of submarine reservoirs (Eidesmo, Terje et al).

U.S. Pat. Appl. Pub. No. 2007/0021916 Electromagnetic surveying for hydrocarbon reservoirs (MacGregor, Lucy et al).

41. U.S. Pat. Appl. Pub. No. 2007/0075708, ELECTROMAGNETIC SURVEY SYSTEM WITH MULTIPLE SOURCES (Reddig, Ransom et al).

A typical f-CSEM marine survey can be described as follows. A recording vessel includes cables which connect to electrodes disposed near the sea floor. An electric power source on the vessel charges the electrodes such that a selected magnitude of alternating current, of selected frequency or frequencies, flows through the sea floor and into the Earth formations below the sea floor. At a selected distance ("offset") from the source electrodes, receiver electrodes are disposed on the sea floor and are coupled to a voltage measuring circuit, which may be disposed on the vessel or a different vessel. The voltages imparted into the receiver electrodes are then analyzed to infer the structure and electrical properties of the Earth formations in the subsurface.

Another technique for electromagnetic surveying of subsurface Earth formations known in the art is transient controlled source electromagnetic surveying (t-CSEM). In t-CSEM, electric current is imparted into the Earth at the Earth's surface (or sea floor), in a manner similar to f-CSEM. The electric current may be direct current (DC). At a selected time, the electric current is switched off, switched on, or has its polarity changed, and induced voltages and/or magnetic fields are measured, typically with respect to time over a selected time interval, at the Earth's surface or water surface. Alternative switching strategies are possible; as will be explained in more detail below. Structure of the subsurface is inferred by the time distribution of the induced voltages and/or magnetic fields. t-CSEM techniques are described, for example, in Strack, K.-M., 1992, *Exploration with deep transient electromagnetics*, Elsevier, 373 pp. (reprinted 1999).

SUMMARY OF THE INVENTION

A marine electromagnetic sensor cable according to one aspect of the invention includes a plurality of sensor modules disposed at spaced apart locations along a cable. Each module includes at least one magnetic field sensor and at least one pair of electrodes associated with the module. The electrodes are arranged to measure electric field in a direction along the direction of the cable. The cable is arranged to form a closed pattern.

A marine electromagnetic surveying system according to another aspect of the invention includes a vessel towing at least one electromagnetic antenna in a body of water. A controllable source of electric current is disposed on the vessel. The system includes a plurality of sensor modules disposed at spaced apart locations along a cable. Each module includes at least one magnetic field sensor and at least one pair of electrodes associated therewith. The electrodes are arranged to measure electric field in a direction along the direction of the cable. The cable is arranged to form a closed pattern. The system includes means for recording signals generated by the electrodes and magnetic field sensors in response to electromagnetic energy imparted into the Earth's subsurface by passing electric current through the at least one antenna.

Another aspect of the invention is a marine electromagnetic sensor cable including a plurality of sensor modules disposed at spaced apart locations along a cable. Each module includes at least one pair of electrodes associated therewith. The electrodes are arranged to measure electric field in a direction along the direction of the cable. A plurality of spaced apart magnetic field sensors is associated with each module and arranged to enable determining an electric field amplitude in a direction transverse to the direction of the cable from magnetic field gradient.

A marine electromagnetic surveying system according to another aspect of the invention includes a vessel towing at least one electromagnetic antenna in a body of water. A controllable source of electric current is disposed on the vessel. The system includes a plurality of sensor modules disposed at spaced apart locations along a cable. The sensor cable including a plurality of sensor modules disposed at spaced apart locations along a cable. Each module includes at least one pair of electrodes associated therewith. The electrodes are arranged to measure electric field in a direction along the direction of the cable. A plurality of spaced apart magnetic field sensors is associated with each module and arranged to enable determining an electric field amplitude in a direction transverse to the direction of the cable from magnetic field gradient.

A method for measuring magnetotelluric response of the Earth's subsurface according to another aspect of the invention includes measuring transient controlled source electromagnetic response of the Earth's subsurface below the bottom of a body of water over a plurality of actuations of an electromagnetic transmitter. The transient response measurements are stacked and the stacked transient response is subtracted from measurements of total electromagnetic Earth response over a time period including the plurality of transient response measurements to generate the magnetotelluric response.

A method for determining a component of electric field response to a time varying electromagnetic field induced in the Earth's subsurface according to another aspect of the invention includes measuring magnetic field gradient in at least two orthogonal directions in response to the induced electromagnetic field and determining an electric field response in a direction normal to the magnetic field gradient measurements.

Another aspect of the invention is a method for determining a component of electric field response of the Earth's subsurface to a time varying electromagnetic field induced in the Earth's subsurface. A method according to this aspect of the invention includes measuring electric field response along a substantially closed pattern on at least one of the Earth's surface and the bottom of a body of water and determining an electric field response in a direction normal to the measured electric field response using electric field response measurements made at opposed positions along the closed pattern.

Other aspects and advantages of the invention will be apparent from the following description and the appended claims.

DETAILED DESCRIPTION

Figure 1:
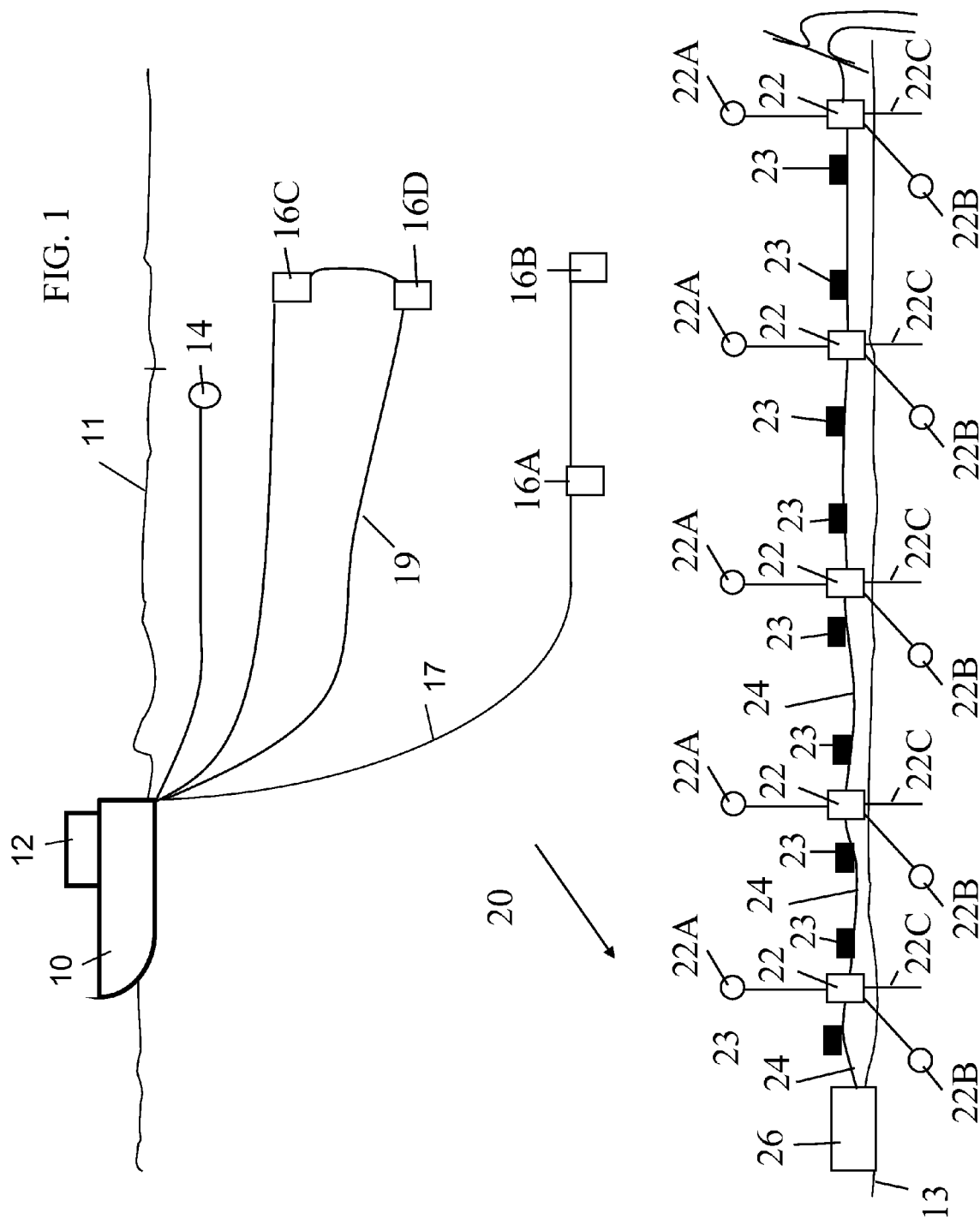
FIG. 1 shows a marine EM acquisition system that may include acquisition modules according to various aspects of the invention.

One example of a marine electromagnetic (EM) survey acquisition system is shown schematically in FIG. 1. The system may include a survey vessel 10 that moves along the surface of a body of water 11 such as a lake or the ocean. The survey vessel 10 includes thereon certain equipment, shown generally at 12 and referred to for convenience as a "recording system." The recording system 12 may include (none of the following shown separately for clarity of the illustration) navigation devices, source actuation and control equipment, and devices for recording and processing measurements made by various sensors in the acquisition system. The vessel 10 may tow a seismic energy source 14 such as an air gun or an array of such air guns, a vertical electric dipole "source" antenna 19 including vertically spaced apart electrodes 16C, 16D and a horizontal electric dipole "source" antenna 17, which may include horizontally spaced apart electrodes 16A, 16B. The vertical electrodes 16C, 16D are typically energized by current flowing through one of the lines going from either electrode 16C or 16D to the survey vessel 10. The other line may be electrically inactive and only used to keep the vertical dipole antenna in is preferred shape. The electrodes on the source antennas 17, 19 may be referred to as "source electrodes" for convenience. The recording system 12 may include a controllable power supply (not shown separately) to energize the source electrodes for the purpose of inducing electromagnetic fields in the subsurface below the water bottom 13.

In the present example the source electrodes 16A, 16B and 16C, 16D, respectively on each antenna 17, 19, can be spaced apart about 50 meters, and can be energized by the power supply (not shown) such that about 1000 Amperes of current flows through the electrodes. This is an equivalent source moment to that generated in typical electromagnetic survey practice known in the art using a 100 meter long transmitter dipole, and using 500 Amperes current. In either case the source moment can be about $5 \times 10^4$ Ampere-meters. The source moment used in any particular implementation is not intended to limit the scope of this invention.

If the system is configured to record transient EM signals, the electric current used to energize the source electrodes can be direct current (DC) switched off at a particular time or at particular times. Such switching time may be conveniently correlated to a signal recording time index equal to zero. It should be understood, however, that switching DC off is only one implementation of electric current switching that is operable to induce transient electromagnetic effects in the Earth's subsurface. In other examples, the electric current (DC) may be switched on, may be switched from one polarity to the other (bipolar switching), or may be switched in a pseudo-random binary sequence (PRBS) or any hybrid derivative of such switching sequences. See, for example, Duncan, P. M., Hwang, A., Edwards, R. N., Bailey, R. C., and Garland, G. D., 1980, *The development and applications of a wide band electromagnetic sounding system using pseudo-noise source*, Geophysics, 45, 1276-1296 for a description of PBRS switching. The system may also be configured to record "frequency domain" signals in conjunction with or alternatively to recording transient signals. The power supply (not shown) may in such instances generate a continuous alternating current having one or more selected component frequencies to perform such frequency domain electromagnetic surveying.

The recording system 12 may include equipment (the source controller) that may actuate the seismic source 14 at selected times and may include devices that record, or accept recordings for processing, from seismic sensors (explained below with reference to FIG. 2) that may be disposed in a sensor cable 24 or elsewhere in the acquisition system.

In the present example, the sensor cable 24 is shown disposed on the water bottom 13 for making measurements corresponding to Earth formations below the water bottom 13. The sensor cable 24 may include thereon a plurality of longitudinally spaced apart sensor modules 22. Examples of components in each sensor module 22 will be further explained below with reference to FIGS. 2 and 3. Each sensor module 22 may have inserted into an upper side thereof a substantially vertically extending sensor arm 22A. Details of one example of the vertically extending sensor arm 22A will be explained below with reference to FIG. 3. Preferably the vertically extending sensor arm 22A includes therein or thereon some type of buoyancy device or structure (not shown separately) to assist in keeping the sensor arm 22A in a substantially vertical orientation with respect to gravity. Each sensor module 22 may include extending from its lower side a spike 22C as described, for example, in Scholl, C. and Edwards, N., 2007, *Marine downhole to seafloor dipole-dipole electromagnetic methods and the resolution of resistive targets*, Geophysics, 72, WA39, for penetrating the sediments that exist on the water bottom 13 to a selected depth therein. Disposed about the exterior of portions of the sensor cable 24 adjacent each longitudinal end of each sensor module 22 may be galvanic electrodes 23 which are used to measure voltages related to certain components of electric field response to induced electromagnetic fields in the subsurface. In the present example, laterally extending sensing arms 22B may be disposed from one or both the sides of each sensor module 22. Such sensing arms 22B will be explained in more detail with reference to FIG. 3. The sensor cable 24 may in some implementations be disposed on the water bottom 13 in a closed pattern that will be further explained with reference to FIG. 4.

Signals acquired by various sensing devices associated with each module 22 and the cable 24 may be transmitted to and stored in a recoding node 26. Such transmission may be made by including in the cable 24 one or more electrical and/or optical conductors (not shown) to carry electrical power and/or data signals. The recording node 26 may be disposed on the water bottom 13 as shown on disposed in a buoy (not shown) at the discretion of the system designer. The recording node 26 may include any form of data storage device, for example a terabyte-sized hard drive or solid state memory. If disposed on the water bottom 13 as shown in FIG. 1, the recording node 26 may be retrieved from the water bottom 13 by the vessel 10 to interrogate the storage device (not shown), or the storage device (not shown) may be accessed for interrogation by connecting a data transfer cable (not shown) to a suitable connector or port (not shown) on the recording node 26. The manner of data storage and transfer with respect to the node 26 may be according to well known art and are not intended to limit the scope of this invention.

Figure 2:
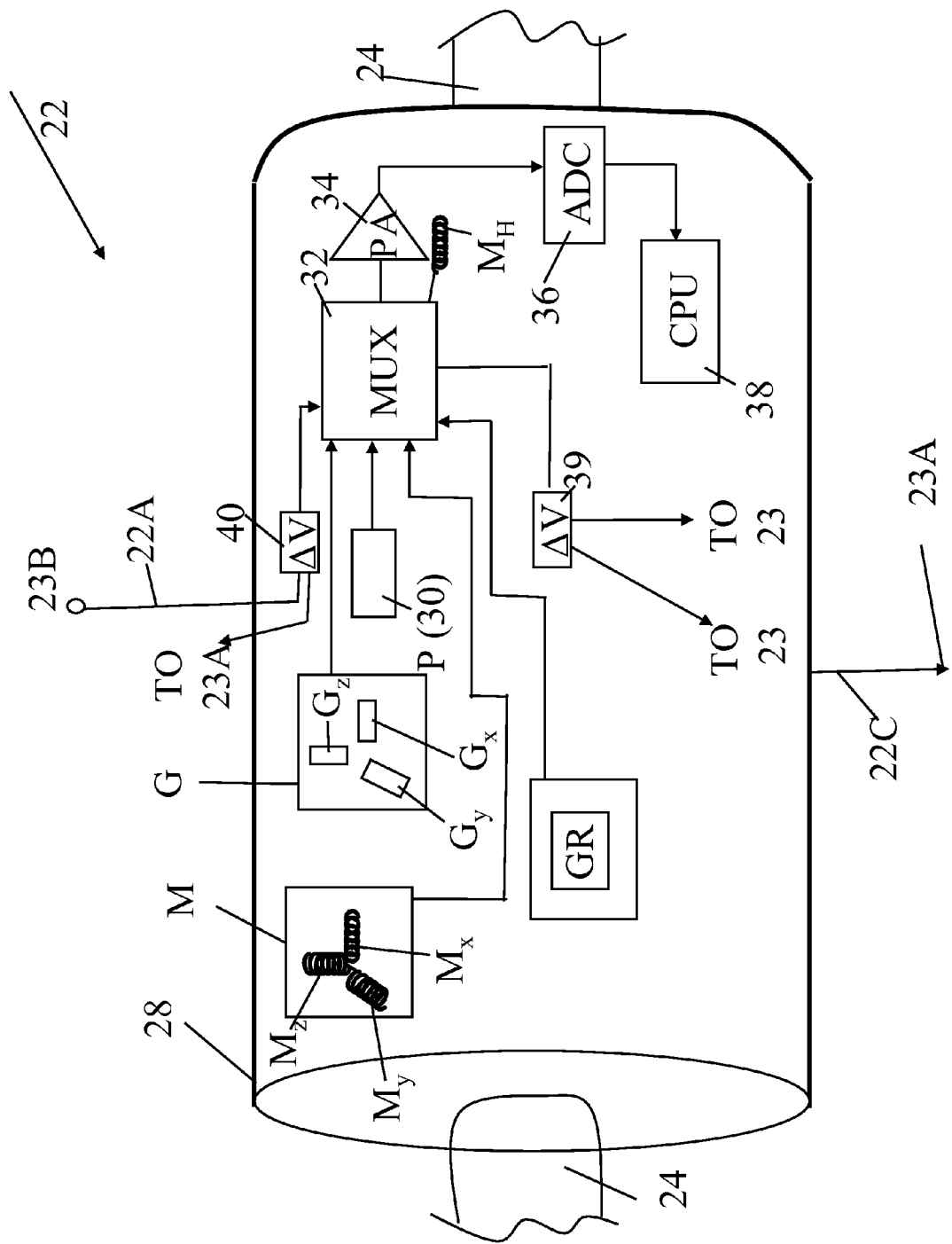
FIG. 2 shows one example of an acquisition module that may be used with the system shown in FIG. 1.

One example of the sensor module 22 is shown in cut away view in FIG. 2. The sensor module 22 may include a sealed, pressure resistant housing 28 affixed to the cable 24 at a selected position along the cable 24. The housing 28 may be affixed to the cable 24 by splicing within the cable, by molding the housing 28 thereon or by using water tight, pressure resistant electrical and mechanical connectors on each of the cable 24 and housing 28, such as a connector shown in U.S. Pat. No. 7,113,448 issued to Scott.

The interior of the housing 28 may define a pressure sealed compartment that may include some or all of the components described below. Sensing elements in the module 22 may include a three-axis magnetometer M that includes horizontal Mx, My and vertical Mz component magnetic field sensors. A three component seismic particle motion sensor G may also be disposed in the housing 28. The seismic particle motion sensor G may include three mutually orthogonal motion sensors Gx, Gy, Gz such as geophones or accelerometers. The seismic sensor G detects particle motion components of a seismic wavefield induced by the seismic source (14 in FIG. 1). The sensor module 22 may also include a hydrophone 30 in pressure communication with the water (11 in FIG. 1) for detecting the pressure component of the seismic wavefield induced by the seismic source (14 in FIG. 1). The sensor module 22 may also include a gravity sensor GR within the housing 28. The sensor module 22 may include voltage measuring circuits 39, 40 to measure voltages impressed across pairs of galvanic electrodes (23 in FIG. 1) disposed on opposed sides of the module 22 along the cable 24. In the present example, the electrode pairs may also include an electrode disposed along or at the end of each of the vertical sensing arm 22A (the electrode shown at 23B) and the spike 22C (the electrode shown at 23A). The vertical sensing arm 22A may be coupled to the housing 28 in a manner as will be explained below with reference to FIG. 3.

Signals generated by each of the sensing devices described above may enter a multiplexer 32. Output of the multiplexer 32 may be conducted through a preamplifier 34. The preamplifier may be coupled to the input of an analog to digital converter (ADC) 36, which converts the analog voltages from the preamplifier 34 into digital words for storing and processing by a central processor 38, which may be any microprocessor based controller and associated data buffering and/or storage device known in the art. Data represented by digital words may be formatted for signal telemetry along the cable 24 to the recording node (26 in FIG. 1) for later retrieval and processing, such as by or in the recording system (12 in FIG. 1). The sensor module 22 may also include one or more high frequency magnetometers MH in signal communication with the multiplexer 32 and the components coupled to the output thereof.

Figure 3:
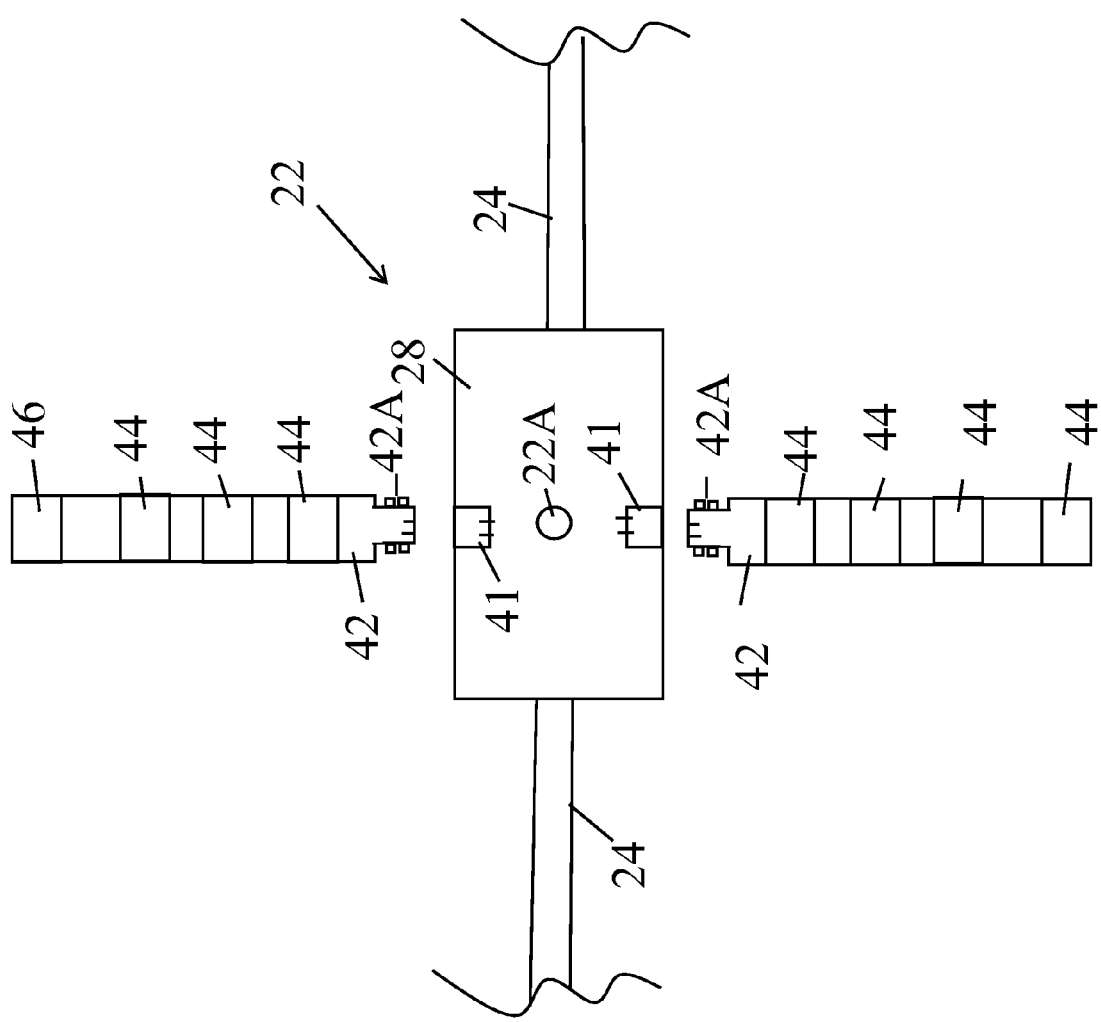
FIG. 3 shows another example of an acquisition module.

The example sensor module 22 of FIG. 2 is shown in plan view in FIG. 3. The horizontal sensing arms 42 (also shown as 22B in FIG. 1) may be coupled to the housing 28 using pressure-sealed electrical connectors 42A that mate with corresponding connectors 41 in the housing 28. The sensing arms 42 may alternatively be permanently attached to the sensor module 22 and foldable as well. The connectors 42A, 41 include one or more insulated electrical contacts to communicate power and/or signals to various sensing elements in the horizontal sensor arms 42. The sensing elements may include a plurality of spaced apart single or multi-axis magnetic field sensors 44, and a galvanic electrode 46. The vertical sensing arm 22A may be similarly configured to have an electrode and multiple magnetic field sensors. The spike (22C in FIG. 2) may be similarly instrumented with such sensing devices. The various sensor arms and the spike may be configured such that they may be lockingly and quickly installed into the housing as shown as the cable 24 is extended into the water (11 in FIG. 1) from the survey vessel (10 in FIG. 1).

Configured as explained with reference to FIGS. 2 and 3, the sensor module 22 includes sensing devices to measure electric field in three dimensions, magnetic field in three dimensions and magnetic field gradient in at least two directions. Magnetic field gradient may be measured along the direction of the cable 24 (the third direction) by measuring difference between magnetic field measurements made in adjacent modules 22, or between successively more spaced apart modules 22 along the cable 24. By measuring spatial components of magnetic field gradient, it may be possible to determine components of electric field in a direction transverse to the magnetic field gradient measurements. Ampere's law states that the spatial gradient of the magnetic field is equivalent to the derivative in time of the dielectric displacement field plus the free current density, as shown in equation (1) below:

$$\vec{\nabla} \times \vec{H} = \vec{J} + \frac{\partial \vec{D}}{\partial t} \quad (1)$$

Because the dielectric displacement field is coupled by the electrical permittivity to the electric field E, the change with respect to time of the y-component of the electric field, Ey, field can be calculated if the spatial changes of the z-component of the magnetic field, Hz, with respect to position along the cable, x, and cable direction spatial change in magnetic field, Hx, with respect to vertical, z, are known. Thus, by measuring magnetic field gradient along selected directions using a cable system as shown herein, it is possible to determine a transverse component of the electric field.

Figure 4:
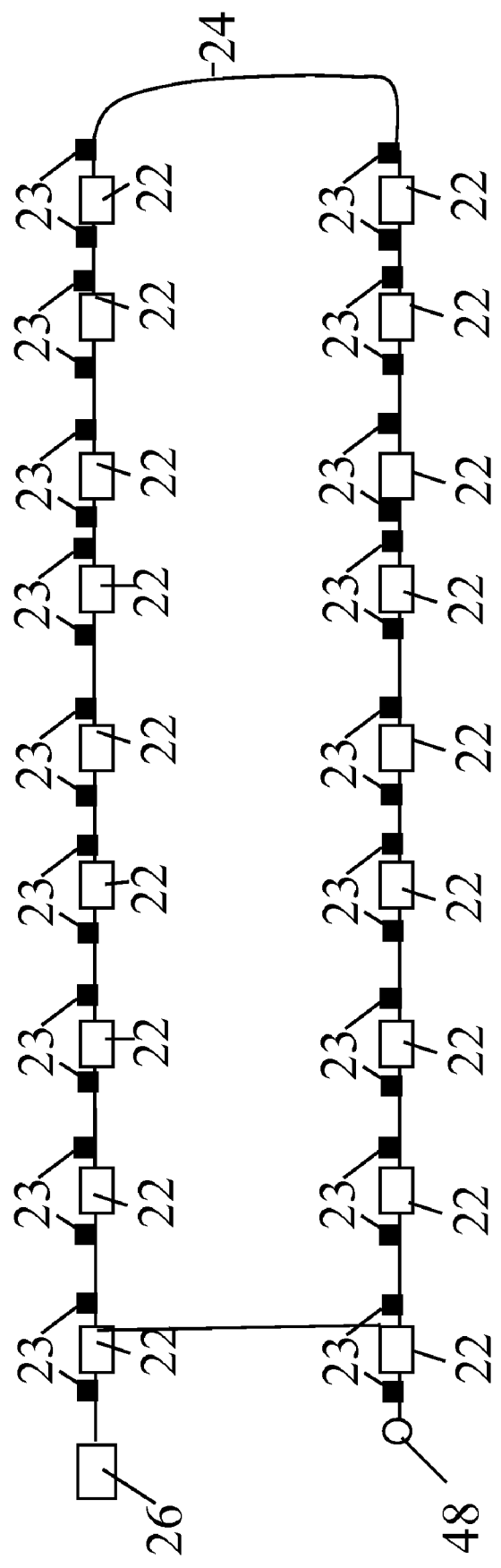
FIG. 4 shows another example of an acquisition system.

One example of deployment of a cable system is shown in FIG. 4. The cable 24 may include a tail buoy 48 at its distal end from the recording node 26, and may be disposed on the water bottom in a substantially closed pattern. Note that the system shown in FIG. 4 may omit the horizontal sensing arms 42 for determining transverse components of the electric field. This is because the sum of the electric field components within a closed loop is equal to zero. As a result, when the electrodes 23 are disposed in a closed pattern as shown in FIG. 4, transverse components of electric field between laterally opposed pairs of electrodes (positions along the closed pattern) may be inferred from the electric field measurements made between the longitudinally spaced electrodes at such opposed positions. Alternatively, the horizontal sensing arms 42 may be included and measurements of electric field and magnetic field gradient may be used to quality check the determination of lateral electric field component determined by magnetic field gradient measurement and by electric field difference determination at selected positions along the closed pattern.

If components of the electric field transverse to the direction of the cable are determined by measuring magnetic field gradient or by using transversely mounted sensing arms, it may be possible to conduct a survey without having the cable in a closed loop configuration as shown in FIG. 4. The system shown in FIG. 4 may provide certain advantages as explained above.

Figure 5:
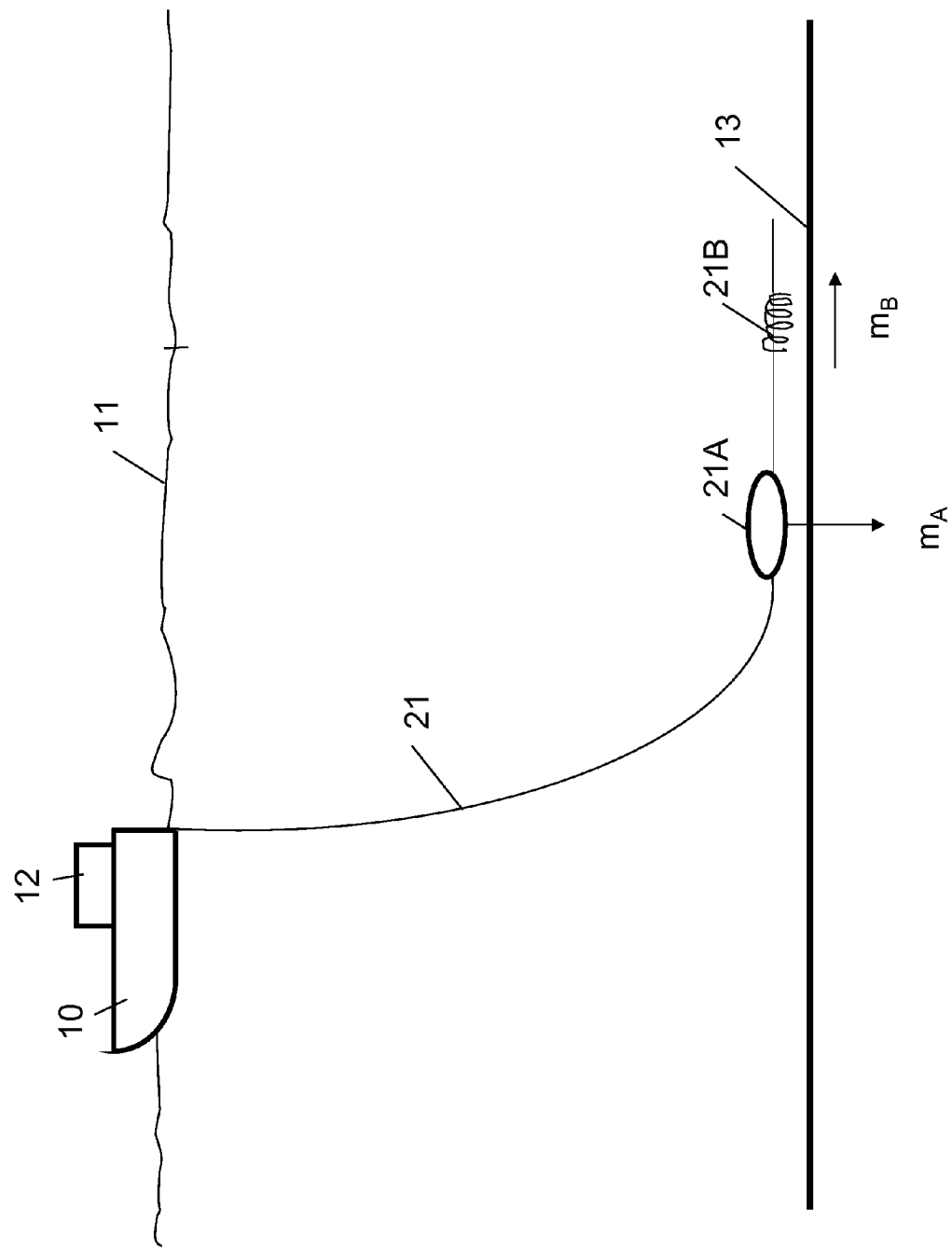
FIG. 5 shows inducing magnetic fields in the Earth's subsurface.

The system shown in FIG. 1 includes horizontal and/or vertical electric dipole antennas for inducing an electric field in the Earth's subsurface, wherein electric and magnetic responses of the Earth are measured. It should be understood that the invention is equally applicable where magnetic fields are induced. Referring to FIG. 5, the survey vessel 10 may tow loop antennas 21A 21B at the end of a cable 21. The recording system 12 may pass electrical current through horizontal loop antenna 21A to induce a vertical magnetic field $m_A$ in the subsurface, and through vertical loop antenna 21B to induce a horizontal magnetic field $m_B$ in the subsurface. Measurements made by the various sensing devices in the system (see FIGS. 2 through 4) may be made in response to such magnetic fields. Magnetic fields may be induced in addition to as well as an alternative to electric fields for any particular electromagnetic survey.

It will also be apparent to those skilled in the art that the sensor cable (24 in FIG. 1) can also be arranged in a line, particularly where the horizontal sensing arms are used, and/or where spaced apart magnetic field sensors are used to determine transverse components of electric field from the magnetic field gradient.

The sensor cable 24 may also be used with magnetotelluric measurement methods and is not limited to controlled source electromagnetic measurement methods. In one example of a method according to the invention, a plurality of transient controlled source electromagnetic measurements (t-CSEM), including one or more of electric field and magnetic field are made along one or more selected directions using a cable as shown in FIG. 4. Preferably, such measurements of electric and magnetic field are made along three orthogonal directions. For such plurality of measurements, preferably the source antenna (FIG. 1) is in a substantially fixed position. The electric and magnetic field measurements are summed or stacked. The result of the stacking is a high quality t-CSEM signal response. The stacked t-CESM signal response may then be subtracted from the signals recorded over a substantial period of time. The result will be the magnetotelluric (MT) response measured by all the various sensing elements on the cable. The MT response may be processed according to techniques known in the art. See, for example, U.S. Pat. No. 6,950,747 issued to Byerly.

When MT response is determined as explained above, and processed according to one or more techniques known in the art, it then becomes possible to perform a joint inversion of the t-CSEM and MT responses. If frequency domain electromagnetic response is measured, such response may also be jointly inverted. Joint inversion is described, for example, in U.S. Pat. No. 5,870,690 issued to Frenkel et al. A particular benefit that may be provided by making both CSEM and MT measurements from the same sets of sensing devices, and processed through the same electronic circuitry, for the purposes of join inversion is that the degree of scaling or other response matching that would be required if the MT and CSEM responses were measured using separate systems, is substantially reduced.

Using a sensor cable as shown herein, it is also possible to perform electric field mapping in order to correct the MT response measurements for static shifts. See, for example, Stemberg, B. K., Washburne, J. C. and Pellerin, L., 1988, *Correction for the static shift in magnetotellurics using transient electromagnetic soundings*, Geophysics, Volume 53, Issue 11, pp. 1459-1468. Prior to having a cable as explained herein, the technique disclosed in the foregoing publication was only applicable for land-based surveys. Using a cable and method according to the invention, however, it is possible to correct the MT response for statics using the t-CSEM response measured by the same sensing elements in the sensor cable disposed on the sea floor. See also, Torres-Verdin, C, 1991, *Continuous profiling of magnetotelluric fields*, Ph.D. Thesis, University of California, and Torres-Verdin, C. and Bostick Jr, F. X., 1992, *Principles of spatial surface electric field filtering in magnetotellurics: Electromagnetic array profiling (EMAP)*, Geophysics, Volume 57, Issue 4, pp. 603-622. As explained in one or more of the foregoing publications, the MT response may be subject to vertical shifting in the log domain. Such shifting is caused by relatively conductive or resistive "patches" of formation close to the water bottom. The t-CSEM response is substantially unaffected by such patches, however, and may be used to calibrate the MT response for the effects of such patches.

A sensor cable and EM measurement system and methods according to the various aspects of the invention may provide more electromagnetic measurement components with data quality checking capabilities, and may be easier to deploy than other EM cable systems and separate EM/seismic/gravity/magnetic cable sensing systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for measuring magnetotelluric response of the Earth's subsurface, comprising:
    measuring transient controlled source electromagnetic response of the Earth's subsurface below the bottom of a body of water over a plurality of actuations of an electromagnetic transmitter;
    stacking the transient response measurements; and
    subtracting the stacked transient response from measurements of total electromagnetic Earth response over a time period including the plurality of transient response measurements to generate the magnetotelluric response.

2. The method of claim 1 wherein the transient controlled source electromagnetic response is produced by inducing a transient magnetic field in the Earth's subsurface.

3. The method of claim 1 wherein the transient controlled source electromagnetic response is produced by inducing a transient electric field in the Earth's subsurface.

4. The method of claim 1 further comprising static correcting the magnetotelluric response using the at least one of the transient response measurements and the stacked transient response measurements.

5. The method of claim 1 further comprising jointly inverting the magnetotelluric response and the transient response measurements.

* * * * *